United States Patent [19]
Braca et al.

[11] 3,821,060
[45] June 28, 1974

[54] MAGNETICALLY CODABLE MACHINE READABLE POLYMERIC ARTICLE

[75] Inventors: Joseph F. Braca, Huntington; John E. Hynes, Danbury, both of Conn.

[73] Assignee: Pitney-Bowes, Inc., Stamford, Conn.

[22] Filed: Dec. 11, 1972

[21] Appl. No.: 313,959

Related U.S. Application Data

[63] Continuation-in-part of Ser. No. 161,118, July 9, 1971, abandoned.

[52] U.S. Cl. .................. 161/39, 40/2.2, 156/298, 156/303, 156/307, 161/145, 274/41.4
[51] Int. Cl. ....... B32b 3/08, B32b 3/22, G11b 3/82
[58] Field of Search .......... 161/5, 39, 145; 156/298, 156/303.1, 307; 40/2.2; 74/41.4, 45

[56] References Cited

UNITED STATES PATENTS

| | | | |
|---|---|---|---|
| 3,471,862 | 10/1969 | Barney | 40/2.2 UX |
| 3,601,913 | 8/1971 | Pollock | 40/2.2 |
| 3,725,184 | 4/1973 | Scopp | 40/2.2 X |
| 3,732,640 | 5/1973 | Changnon | 40/2.2 |
| 3,755,935 | 9/1973 | Annenberg | 40/2.2 |

*Primary Examiner*—Philip Dier
*Attorney, Agent, or Firm*—William D. Soltow, Jr.; Albert W. Scribner; Peter Vrahotes

[57] ABSTRACT

A magnetically codable article of manufacture and a method for making same are described. The finished articles of manufacture comprise a polymeric matrix of some rigidity having magnetic tape stripes integrally bonded therein on a plane with and in close proximity to the surface thereof in order that the said magnetic tape stripe can be conveniently read by such information retrieval equipment ordinarily employed for such purpose. The magnetic tape stripe is incorporated into the polymeric matrix by a heated-fushion bonding, under pressure, to yield a finished polymeric article of manufacture having said magnetic tape stripe integrally bonded therein, substantially flush with a surface thereof, said surface possessing very desirable physical characteristics.

2 Claims, 6 Drawing Figures

INVENTOR.
JOSEPH F. BRACA
BY
Albert W. Scribner
ATTORNEY

A MAGNETICALLY CODABLE MACHINE READABLE POLYMERIC ARTICLE

This application is a continuation-in-part of a previously filed copending U.S. Pat. application Ser. No. 161,118, filed July 9, 1971 in the name of Joseph F. Braca and now abandoned.

This invention relates to and has as its object the production of an article of manufacture having incorporated therein a magnetically codable machine readable magnetic tape stripe, and to novel methods of producing the same. More particularly, this invention relates to the production of articles of manufacture used in conjunction with data processing systems, and which are carriers of magnetically codable data by means of a magnetically codable machine readable magnetic tape stripe being incorporated therein, and to novel methods for their production.

In today's society there is a growing need to conveniently and efficiently transport data useful in conjunction with electronic data processing systems. More particularly, it has been found necessary to devise methods whereby individuals are enabled to conveniently transport an amount of personalized information in such a manner as it may be conveniently and efficiently collected and employed at widespread information collection locations for use in conjunction with electronic data processing systems presently in operation. Examples of the kinds of information and data processing systems contemplated herein are those which involve credit verification of individuals, for example, at point of sale locations; verification of identification for security purposes, for example, entrance to or egress from various secured locations; records of personal necessary facts, for example, medical histories of individuals; records for activities performed at different locations, for example, credit cards for purchases, inventory control and the like.

To satisfy the need for the kind of information contemplated hereunder various methods have been devised and are presently generally employed. One such method which is very satisfactory for this purpose involves the incorporation of a stripe of magnetic tape in an easily transportable carrier, for example, a polymeric matrix, such as a card composed of polymeric material, for example, polyvinyl chloride, polyvinyl acetate or polyethylene terephthalates. The stripe of magnetic tape contains the desired information and is machine readable, for incorporation in or use with a compatable data processing system.

A specific example of such a process involves the employment of this system in conjunction with machine readable credit cards. Machine readable credit cards are commonly used in conjunction with data processing systems and point-of-sale terminals to up-date account data in accordance with current purchases and in some instances for automatic bank teller operations for cash dispensing and bank transactions. In a typical system a machine readable credit card is presented for credit at a point of sale, such as a restaurant or department store. A credit card reader at the point of sale scans the card to read coded data therefrom, and transmits the data to a central data processing system along with purchase data such as the amount of the sale and the identification of the point of sale. The data processor responds to the transmitted data by verifying the credit status of the account, and appropriate displays are used to provide convenient and rapid credit authorization.

An important element in the credit authorization system is the machine readable credit card. It must preserve its coded data despite a substantial amount of abusive handling resulting from its use and from carrying the card in a wallet or purse.

The magnetically codable credit card has recently been officially adopted by the American Bankers Association. Such credit card employs a stripe of magnetic material capable of storing information characters with a high character density. The stripe must meet precise dimensional requirements, including a substantially flush fit with the surface of the card, well-defined edges and surface smoothness within prescribed limitations, as well as requirements as to the quality of signal amplitude on readback of the information. In addition the magnetic stripe should firmly adhere to the card and not separate under normal use.

In addition to its application on credit cards, this system has been or may also be employed in connection with such deverse items as, medical records; memory cards for programable calculators; computer software, for example, entry on terminal cards; security devices, such as keyless locks operated on electromagnetic principles; initiation of automatic preprogramed machine operations; identification cards; and otherlike articles which can be employed and are useful as carriers of electronic data.

In all the uses and articles contemplated herein, the desired information is encoded on a magnetic tape which is incorporated on a vehicle composed of a polymeric material in such a manner that the information is easily and efficiently available for machine reading and incorporation in an electronic data processing system. The manufacture of such articles having the magnetic tape incorporated thereon is well known. However, heretofore each of the processes employed has suffered from various disabilities or disadvantages. In one method heretofore employed in applying the magnetic tape to the polymeric matrix carrier, a silk screening process is utilized whereby a magnetic-particle-carrying paste is forced through stripe-defining segments of a silk screen onto polymeric carrier, for example, polyvinyl chloride credit card stock material. The screen, which is formed of a fine mesh material, tends to align the acircular, or needle-like, magnetic particles in a direction perpendicular to the surface of the polymeric carrier stock surface. This transverse orientation reduces the frequency response of the recorded information and also reduces the signal quality from the magnetic transducer, the equipment usually employed to electronically read magnetic tape.

In another known method, magnetic material incorporating a resin binder is extruded in stripes onto a polymeric carrier sheet. The extruded stripe, however, is so sensitive to extrusion pressure and viscosity variations that stripe thickness and edge definition are difficult to control.

Another known method for forming magnetically codable polymeric carrier products employs Mylar magnetic tape (polyethylene terephthalate). The Mylar tape is applied to the polymeric carrier with an adhesive and is pressed into the polymeric matrix carrier surface to provide a flush fit. The Mylar material, however, is not compatible with all of the polymeric materials employed in the various carriers herein contemplated and therefore it does not provide long lasting adhesion to the carrier and is subject to separation during use.

A transfer process has also been proposed, whereby the magnetic oxide coating of a heated Mylar tape is transferred to a heat-softened polymeric carrier surface. This process requires careful control of pressure and temperature, lest excessive pressure permanently deform the polymeric carrier surface or too little pressure fail to achieve a flush surface fit. The transfer process also tends to be slow, and care must be exercised to prevent heat damage to the magnetic oxide binder. In this process the resultant stripe is not flush but is depressed below the surface of the polymeric matrix reducing the amplitude and frequency response of signal on readback.

We have now discovered a method for making magnetically codable machine readable polymeric articles, which overcomes the disadvantages heretofore experienced. More particularly we have discovered a method of producing easily transportable cards or other similar articles comprised of a polymeric substance, which have fusion bonded thereto to form an integral part thereof, a magnetic tape capable of accepting and imparting electronic data for use in conjunction with electronic data processing systems. Even more particularly, we have discovered a method of fusion bonding a magnetic tape stripe on the surface of a polymeric sheet matrix, whereby electronic data may be easily and conveniently incorporated and retreived, which magnetic tape stripe is durable and offers some protection from abrasive surface damage. In addition, we have found a method wereby the surface of said stripe is made uniform with the surface of the polymeric sheet matrix, thus having a highly polished character, which not only offers some protection from abrasion of the surface of the magnetic tape, but does not interfere with the quality of the electronic data obtainable from the resultant magnetically codable polymeric matrix carrier, and in addition is aesthetically pleasing in providing a smooth and highly polished surface thereof.

Generally speaking, our invention involves the fusion bonding of a magnetic tape which is comprised of a polymeric vehicle, for example, polyvinyl chloride polyvinyl chloride acetate, polyvinyl acetate or polyethylene terephthalate, to a polymeric matrix carrier comprised of the same or like material as the magnetic tape vehicle, whereby the magnetic tape becomes an integral part of the polymeric matrix carrier. Thus, this invention may be practiced satisfactorily wherein a magnetic tape of polyvinyl chloride is desired to be bonded to a polymeric matrix carrier of polyvinyl chloride or a polyvinyl chloride acetate tape is to be bonded to a polymeric matrix of polyvinyl chloride acetate; or a polyvinyl acetate tape is to be bonded to a polymeric matrix carrier of polyvinyl acetate; or a Mylar tape is to be bonded to a polymeric matrix carrier of Mylar.

In the most preferred embodiment of this invention a polyvinyl chloride magnetic tape is fusion bonded, according to the process of this invention, to a carrier matrix of polyvinyl chloride acetate, and in a most specifically preferred embodiment of this invention, the polymeric matrix carrier is credit card sheet stock comprised of polyvinyl chloride acetate.

In the preferred process of the invention a completed conventional three-layered credit card stock sheet defining an array of individual credit cards is provided with magnetic stripes in the form of thin tapes. The tapes have a carrier formed of a material which is compatible with a selected outer layer of the laminate credit card sheet. A thin stripe of solvent-weld for the carrier and the selected outer layer is deposited on the outer layer, and is placed in selected registration on the credit card stock sheet. The stripe of solvent-weld is subsequently covered by the magnetic tape. Heat and pressure are then applied to merge the magnetic tape with the surface of the outer layer and firmly attach the magnetic tape to the credit card stock sheet. The tape-covered credit card stock sheet is then suitably cut into individual credit cards.

The bond between the magnetic tape and the credit card stock sheet is particularly strong and resistant to separation, yet the tape fits essentially flush with the surface of the credit card for minimum signal losses on readback of the information coded on the magnetic stripe.

In addition to the foregoing, it has been found desirable to apply a protective coating over the magnetic tape to protect it from abrasion encountered in normal use. It is also desirable, for aesthetic as well as protective purposes to have a uniform polished surface over the entire surface upon which the magnetic tape is incorporated. To date this has not always been possible due to the character of the tape employed.

It has now been found that the magnetic tape may be satisfactorily incorporated within the surface of the credit card in accordance with the practice of this invention and at the same time obtain a finished card having said tape incorporated therein and possessing a surface which provides some protection from abrasive abuse of the tape and at the same time has a uniform and highly polished surface which is both utilitarian and aesthetically pleasing. This is accomplished by employing a magnetic tape having a carrier which contains an excess of polyvinyl chloride. In this specification and the claims appended hereto, the use of the term "excess" is meant to denote an amount of polyvinyl chloride that upon exposure to the heat and pressure employed in the practice of this invention is sufficient to impart the desired characteristics to the surface of the finished magnetically codable credit cards hereof. In most cases, this excess amount of polymer carrier is comparatively small.

In order to accomplish the objectives of the present invention, the magnetic tape is fused into the face of the credit card by the application of heat and pressure. The temperature range is from about 250° to 425°F and the pressure range from about 15 to 45 tons per square foot. Preferably it is desired to practice this invention at a temperature of from about 275° to 400°F and a pressure of about 20 to 40 tons per square foot.

The resulting magnetically codable credit card bears a magnetic stripe which remains attached during normal use and provides a high quality magnetic coding medium for use in a credit authorization system.

BRIEF DESCRIPTION OF THE DRAWINGS

Although the drawings appended hereto relate to the practice of this invention in regard to credit cards, said drawings should be considered illustrative and not limitative of the invention described herein.

FIGS. 3 and 4 are perspective views, while FIGS. 5 and 6 are end views.

DETAILED DESCRIPTION OF THE PREFERRED EMBODIMENT

Figure 1:
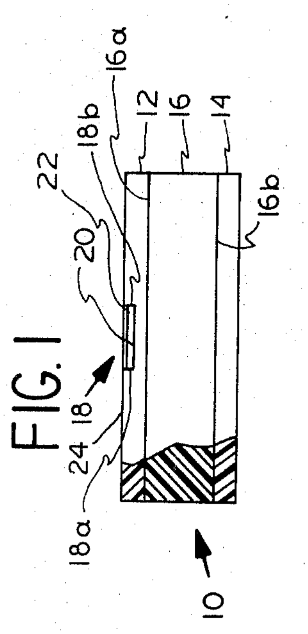
FIG. 1 is an end view of a single credit card made in accordance with the invention, with the depth dimension greatly exaggerated for clarity of illustrative.

The enlarged magnetically codable credit card 10 as shown in FIG. 1 is formed of three layers of polyvinyl chloride acetate sheet stock 12, 14 and 16 laminated together. Clear vinyl layers 12 and 14 overlie the front and back surfaces 16*a* and 16*b* respectively of an opaque core 16 having suitable human readable information printed on the surfaces 16*a* and/or 16*b*. A magnetic tape stripe 18 having a polyvinyl chloride carrier 20 is embedded in the clear vinyl top layer 12. The magnetic oxide coating 22 of the stripe 18 is substantially flush with the top surface 24 of layer 12. The magnetic tape 18 is of the kind usually prepared for high quality audio or digital recording, and therefore has sharply defined lateral edges 18*a* and 18*b* formed by knife-trimming during manufacture of the tape.

Figure 2:
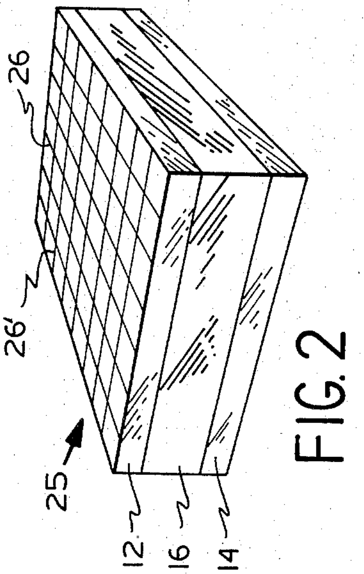
FIG. 2 is a perspective view, with the depth dimension greatly exaggerated for clarity of illustration, of conventional three layer credit card stock sheet comprising an array of individual credit cards prior to severance.

The manufacture of the credit card 10 is conveniently and economically carried out by utilizing, as shown in FIG. 2, a large polyvinyl chloride acetate credit card stock sheet 25 sized to form an array of credit cards as suggested by the intersecting card separation lines 26–26'. The stock sheet surface 24 has a dull, matte finish which enables it to receive the magnetic tape 18 without the formation of bubbles or other surface irregularities.

Figure 3:
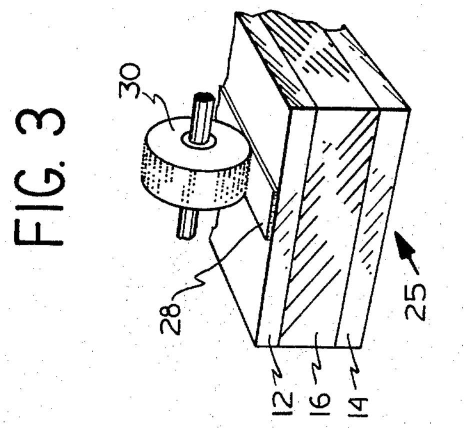
FIGS. 3 through 6 are schematic enlarged fragmentary views of the same credit card stock sheet, and illustrate respectively successive steps in the fabrication of a credit card in accordance with this invention.

The stock sheet 25 is then painted, as shown in FIG. 3, with several stripes of a solvent-weld, such as 28, applied with rollers such as 30. The stripes 28 are located over the areas where magnetic stripes 18 are to be placed, so that the stripes may then be held in place during further handling of the stock sheet 25.

The solvent-weld stripes 28 are preferably a material which is a solvent for both the polyvinyl chloride acetate sheet 25 and the polyvinyl chloride carrier 20 of magnetic tape 18. A suitable material for the solvent-weld 28 is a solvent grade cyclohexanone. The solvent-weld should possess about the viscosity of a watery liquid, and is applied by rollers 30 to about the width of the magnetic tape 18. Other solvent-welds such as methyl ethyl ketone (MEK), methyl isobutyl ketone (MIBK), methyl isoamyl ketone (MIAK) and/or mixtures thereof may be used, as long as both the tape carrier 20 and the layer 12 are at least partially dissolvable in the solvent-weld to form a firm, integral bond with one another.

Figure 4:
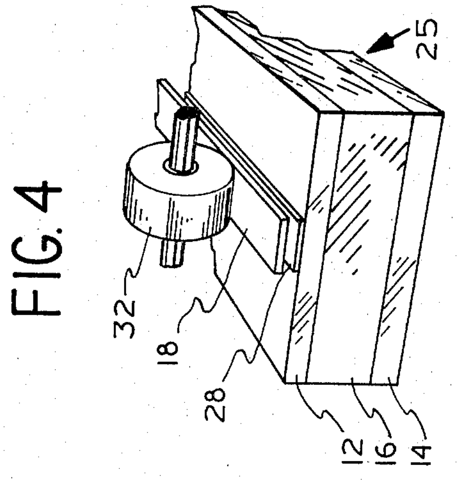

Within seconds following the deposit of adhesive stripes 28, the magnetic tape 18 is pressed over stripes 28 by rollers 32 as shown in FIG. 4, and the tapes are severed from the tape supply at the boundaries of sheet stock 25.

Figure 5:
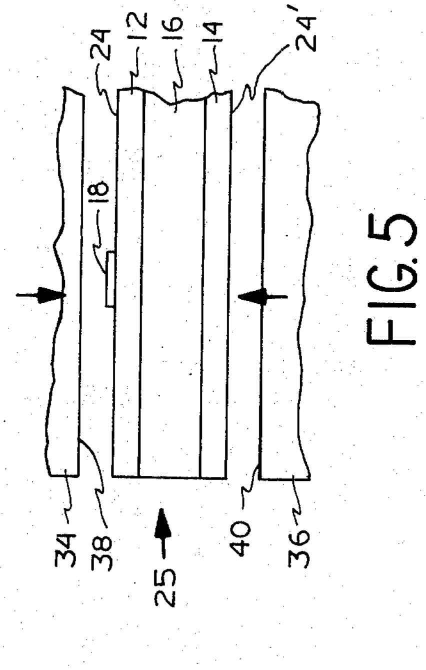

The magnetic tapes 18 are then firmly heat fused to the credit card stock sheet 25 with heat and pressure. The credit card stock sheet, with the magnetic tapes 18 solvent-tacked thereto, is placed between a pair of pressure plates 34 and 36 as shown in FIG. 5. The plates 34 and 36 have flat contact surfaces 38 and 40 with a smooth mirror finish to render the credit card sheet surfaces 24 and 24' glossy and achieve flush seating of the tape 18. The plates 34 and 36 are heated to raise the credit card stock sheet 25 to a temperature of between about 250° and about 425° F when pressed against the stock sheet. A pressure of from about 15 to 45 tons per square foot is employed for sufficient time to effect bonding, which may be as little as 3 minutes. This pressure applied herein should be low enough to avoid stock sheet deformation, yet be sufficient to preclude future delamination of the tape 18 from sheet 25.

Figure 6:
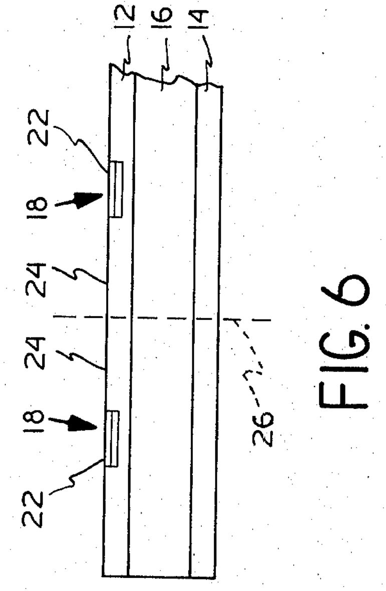

As a result of the heat fusing step, the tape 18 is embedded in the layer 12 of the credit card stock sheet 25 as shown in FIG. 6, so that oxide layer 22 is flush with the top surface 24. The stock sheet 25 may now be cut into individual credit cards by severing the sheet along lines 26–26' (FIGS. 2 and 6).

Consequently, the individual credit cards severed from the array are provided with individual magnetic stripes that are firmly fused to the base credit card material and remain attached thereto during normal use. Because the magnetic tape base is the same material as the card stock, it does not have the tendency to separate from the card. Yet, the magnetic stripe has the sharp edge definition obtainable with knife-trimmed tape. It also avoids the fidelity-reducing acircular grain-orientation problems associated with silk-screening. In addition, the tape stripe has a smooth and polished appearance which is uniform with that of the matrix, which tends to offer some protection against surface abrasion.

Since the foregoing description and drawings are merely illustrative, the scope of protection of the invention has been more broadly stated in the following claims; and these should be liberally interpreted so as to obtain the benefit of all equivalents to which the invention is fairly entitled.

What is claimed is:

1. A magnetically codable machine readable polymeric article comprising a polymeric matrix carrier comprised of a polymeric substance, selected from the group consisting of polyvinyl chloride, polyvinyl acetate and polyethylene terephthalate; and a magnetic tape stripe comprised of a polymeric vehicle comprised of a substance selected from the group consisting of polyvinyl chloride, polyvinyl acetate and polyethylene terephthalate; which matrix and tape stripe are comprised of the same polymeric substance; said magnetic tape stripe being integrally bonded to said matrix carrier and the outer surface of said tape stripe being substantially flush with said carrier surface, and said magnetic tape stripe being adapted to being magnetized after being joined to said matrix carrier.

2. A magnetically codable credit card comprising polyvinyl chloride acetate credit card sheet stock material and a magnetic tape stripe formed of a polyvinyl chloride carrier covered with a magnetic material, said carrier being integrally bonded to a surface of said stock, and the outer surface of said tape being substantially flush with said stock surface.

* * * * *